United States Patent
Akkarakaran et al.

(10) Patent No.: US 11,622,336 B2
(45) Date of Patent: Apr. 4, 2023

(54) SIDELINK TRANSMIT POWER CONTROL COMMAND SIGNALING

(71) Applicant: QUALCOMM Incorporated, San Diego, CA (US)

(72) Inventors: Sony Akkarakaran, Poway, CA (US); Tao Luo, San Diego, CA (US); Junyi Li, Chester, NJ (US); Juan Montojo, San Diego, CA (US); Jung Ho Ryu, Fort Lee, NJ (US); Kapil Gulati, Hillsborough, NJ (US); Hong Cheng, Basking Ridge, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 19 days.

(21) Appl. No.: 16/947,573

(22) Filed: Aug. 6, 2020

(65) Prior Publication Data

US 2021/0045066 A1    Feb. 11, 2021

Related U.S. Application Data

(60) Provisional application No. 62/884,624, filed on Aug. 8, 2019.

(51) Int. Cl.
*H04W 52/24* (2009.01)
*H04W 24/10* (2009.01)
(Continued)

(52) U.S. Cl.
CPC ......... *H04W 52/241* (2013.01); *H04L 1/1819* (2013.01); *H04W 24/10* (2013.01);
(Continued)

(58) Field of Classification Search
CPC ............... H04W 52/241; H04W 24/10; H04W 72/042; H04W 72/0473; H04W 72/14; H04W 80/02; H04W 92/18; H04W 76/14; H04W 84/047; H04W 52/46; H04W 52/383; H04W 52/54; H04L 1/1819;
(Continued)

(56) References Cited

U.S. PATENT DOCUMENTS

| | | | | |
|---|---|---|---|---|
| 10,349,360 | B2 * | 7/2019 | Lee | H04W 8/00 |
| 11,197,249 | B2 * | 12/2021 | Akkarakaran | H04W 24/10 |
| 2017/0208638 | A1 * | 7/2017 | Baghel | H04W 52/04 |
| 2019/0089451 | A1 * | 3/2019 | Seo | H04W 88/04 |
| 2019/0274054 | A1 * | 9/2019 | Salem | H04W 74/006 |
| 2021/0022091 | A1 * | 1/2021 | Li | H04W 52/383 |
| 2021/0410084 | A1 * | 12/2021 | Li | H04W 52/265 |

OTHER PUBLICATIONS (NEC, "3GPP TSG RAN WG1 AdHoc Meeting 1901" R1-1900669, "Physical Layer Procedures for NR V2X", Taipei, Taiwan Jan. 21-25, 2019). (Year: 2019).*
International Search Report and Written Opinion—PCT/US2020/070380—ISA/EPO—dated Nov. 9, 2020.

(Continued)

*Primary Examiner* — Afshawn M Towfighi
(74) *Attorney, Agent, or Firm* — Danai Nelisile Mhembere; Harrity & Harrity, LLP

(57) ABSTRACT

Various aspects of the present disclosure generally relate to wireless communication. In some aspects, a user equipment (UE) may receive, from a source UE, a sidelink communication. The UE may generate a transmit power control command based at least in part on a measurement of the sidelink communication. The UE may transmit, via a sidelink feedback channel, the transmit power control command to control a transmit power, for another sidelink communication, of the source UE. Numerous other aspects are provided.

30 Claims, 7 Drawing Sheets

(51) Int. Cl.
   *H04L 1/1812* (2023.01)
   *H04W 72/04* (2023.01)
   *H04W 72/14* (2009.01)
   *H04W 80/02* (2009.01)
   *H04W 72/044* (2023.01)
   *H04W 92/18* (2009.01)

(52) U.S. Cl.
   CPC ..... *H04W 72/042* (2013.01); *H04W 72/0473* (2013.01); *H04W 72/14* (2013.01); *H04W 80/02* (2013.01); *H04W 92/18* (2013.01)

(58) Field of Classification Search
   CPC ........... H04L 2001/0093; H04L 1/1671; H04L 1/1861; H04L 1/0023
   See application file for complete search history.

(56) References Cited

OTHER PUBLICATIONS

NEC: "Physical Layer Procedures for NR V2X", 3GPP Draft; 3GPP TSG RAN WG1 Ad-Hoc Meeting 1901, R1-1900669, Physical Layer Procedures for NR V2X, 3rd Generation Partnership Project (3GPP), Mobile Competence Centre; 650, Route Des Lucioles; F-06921 Sophia-Antipolis Cedex; France, vol. RAN WG1, No. Taipei, Taiwan; Jan. 21, 2019-Jan. 25, 2019, Jan. 11, 2019 (Jan. 11, 2019), XP051576209, 6 Pages Retrieved from the Internet: URL: http://www.3gpp.org/ftp/tsg%5Fran/WG1%5FRL1/TSGR1%5FAH/NR%5FAH%5F1901/Docs/R1%2D1900669%2Ezip, [retrieved on Jan. 11, 2019], p. 1, p. 4.

* cited by examiner

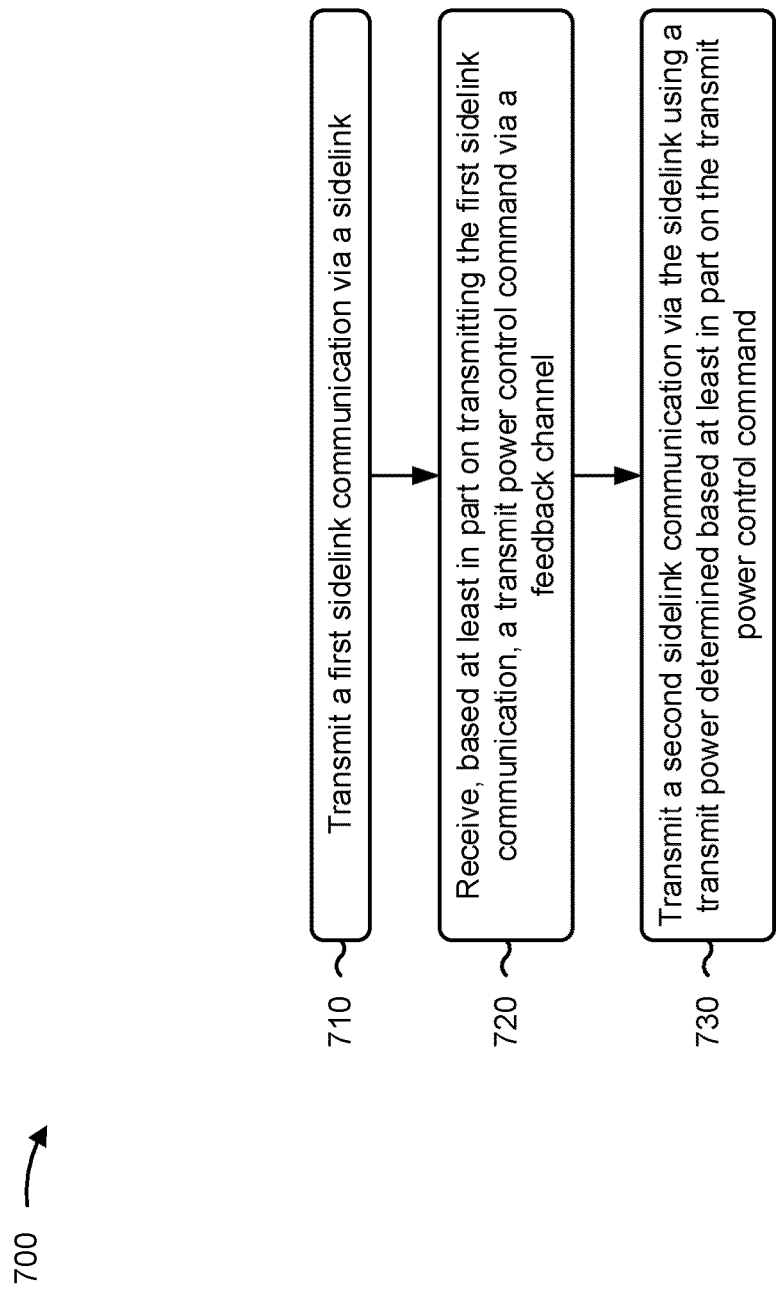

SIDELINK TRANSMIT POWER CONTROL COMMAND SIGNALING

CROSS-REFERENCE TO RELATED APPLICATION

This Patent Application claims priority to U.S. Provisional Patent Application No. 62/884,624, filed on Aug. 8, 2019, entitled "SIDELINK TRANSMIT POWER CONTROL COMMAND SIGNALING," and assigned to the assignee hereof. The disclosure of the prior Application is considered part of and is incorporated by reference into this Patent Application.

FIELD OF THE DISCLOSURE

Aspects of the present disclosure generally relate to wireless communication and to techniques and apparatuses for sidelink transmit power control command signaling.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication, performed by a user equipment (UE), may include receiving, from a source UE, a sidelink communication; generating a transmit power control command based at least in part on a measurement of the sidelink communication; and transmitting, via a sidelink feedback channel, the transmit power control command to control a transmit power, for another sidelink communication, of the source UE.

In some aspects, a method of wireless communication, performed by a network entity, may include determining a transmit power control command for a source UE; and transmitting, to control a transmit power for a sidelink communication, the transmit power control command to the source UE.

In some aspects, a method of wireless communication, performed by a source UE, may include transmitting a first sidelink communication via a sidelink; receiving, based at least in part on transmitting the first sidelink communication, a transmit power control command via a feedback channel; and transmitting a second sidelink communication via the sidelink using a transmit power determined based at least in part on the transmit power control command.

In some aspects, a UE for wireless communication may include memory and one or more processors operatively coupled to the memory. The memory and the one or more processors may be configured to receive, from a source UE, a sidelink communication; generate a transmit power control command based at least in part on a measurement of the sidelink communication; and transmit, via a sidelink feedback channel, the transmit power control command to control a transmit power, for another sidelink communication, of the source UE.

In some aspects, a network entity for wireless communication may include memory and one or more processors operatively coupled to the memory. The memory and the one or more processors may be configured to determine a transmit power control command for a source UE; and transmit, to control a transmit power for a sidelink communication, the transmit power control command to the source UE.

In some aspects, a source UE for wireless communication may include memory and one or more processors operatively coupled to the memory. The memory and the one or more processors may be configured to transmit a first sidelink communication via a sidelink; receive, based at least in part on transmitting the first sidelink communication, a transmit power control command via a feedback channel; and transmit a second sidelink communication via the sidelink using a transmit power determined based at least in part on the transmit power control command.

In some aspects, a non-transitory computer-readable medium may store one or more instructions for wireless communication. The one or more instructions, when executed by one or more processors of a UE, may cause the one or more processors to receive, from a source UE, a sidelink communication; generate a transmit power control command based at least in part on a measurement of the sidelink communication; and transmit, via a sidelink feedback channel, the transmit power control command to control a transmit power, for another sidelink communication, of the source UE.

In some aspects, a non-transitory computer-readable medium may store one or more instructions for wireless communication. The one or more instructions, when executed by one or more processors of a network entity, may cause the one or more processors to determine a transmit power control command for a source UE; and transmit, to control a transmit power for a sidelink communication, the transmit power control command to the source UE.

In some aspects, a non-transitory computer-readable medium may store one or more instructions for wireless communication. The one or more instructions, when executed by one or more processors of a source UE, may cause the one or more processors to transmit a first sidelink communication via a sidelink; receive, based at least in part on transmitting the first sidelink communication, a transmit power control command via a feedback channel; and transmit a second sidelink communication via the sidelink using a transmit power determined based at least in part on the transmit power control command.

In some aspects, an apparatus for wireless communication may include means for receiving, from a source UE, a sidelink communication; means for generating a transmit power control command based at least in part on a measurement of the sidelink communication; and means for transmitting, via a sidelink feedback channel, the transmit power control command to control a transmit power, for another sidelink communication, of the source UE.

In some aspects, an apparatus for wireless communication may include means for determining a transmit power control command for a source UE; and means for transmitting, to control a transmit power for a sidelink communication, the transmit power control command to the source UE.

In some aspects, an apparatus for wireless communication may include means for transmitting a first sidelink communication via a sidelink; means for receiving, based at least in part on transmitting the first sidelink communication, a transmit power control command via a feedback channel; and means for transmitting a second sidelink communication via the sidelink using a transmit power determined based at least in part on the transmit power control command.

Aspects generally include a method, apparatus, system, computer program product, non-transitory computer-readable medium, user equipment, base station, wireless communication device, and/or processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIG. 7 is a diagram illustrating an example process performed, for example, by a source user equipment, in accordance with various aspects of the present disclosure.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with 3G and/or 4G wireless technologies, aspects of the present disclosure can be applied in other generation-based communication systems, such as 5G and later, including NR technologies.

Figure 1:
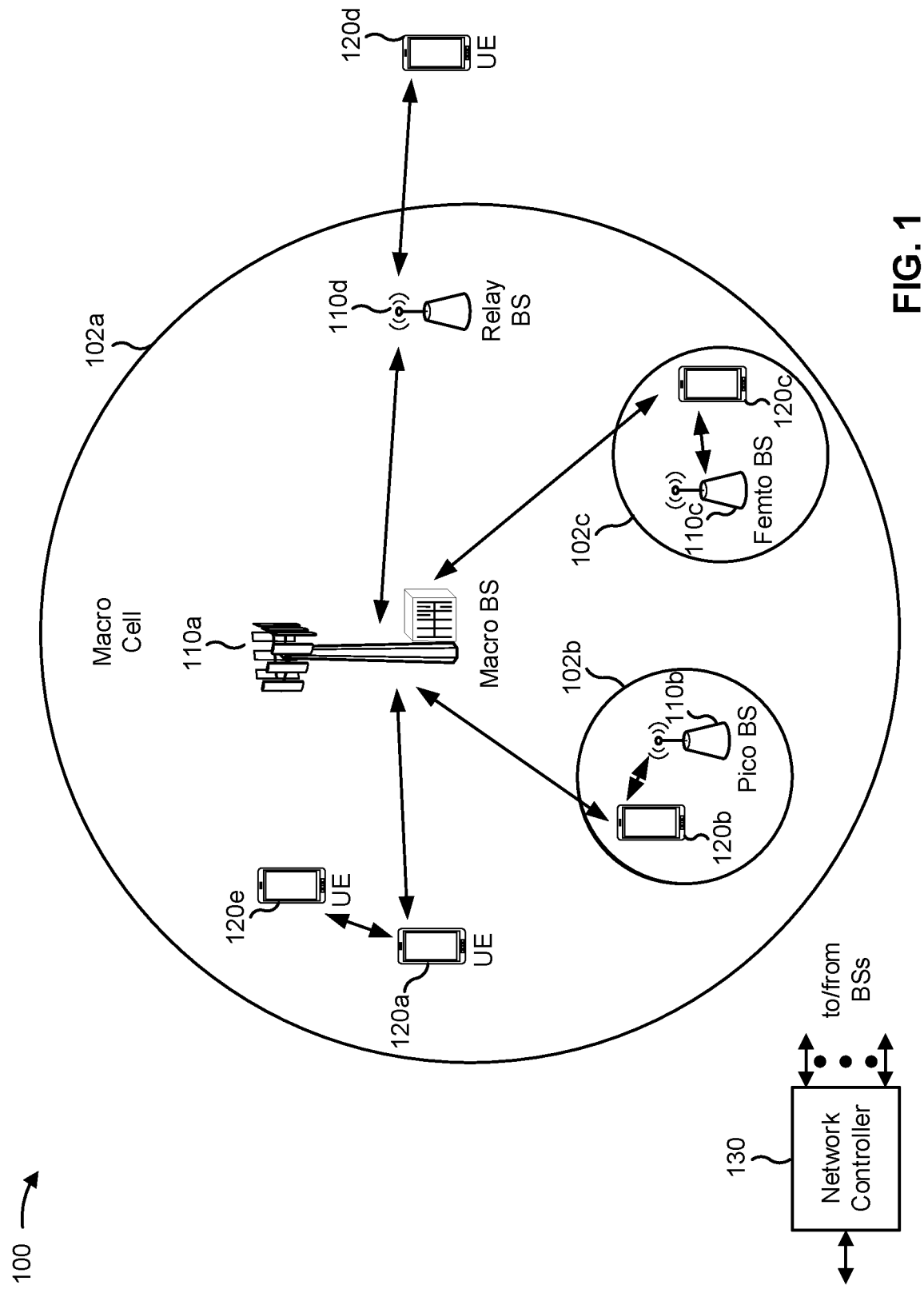
FIG. 1 is a block diagram illustrating an example of a wireless communication network, in accordance with various aspects of the present disclosure.

FIG. 1 is a diagram illustrating a wireless network 100 in which aspects of the present disclosure may be practiced. The wireless network 100 may be an LTE network or some other wireless network, such as a 5G or NR network. The wireless network 100 may include a number of BSs 110 (shown as BS 110a, BS 110b, BS 110c, and BS 110d) and other network entities. A BS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c, 120d, 120e) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an Ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided as an example. Other examples may differ from what is described with regard to FIG. 1.

Figure 2:
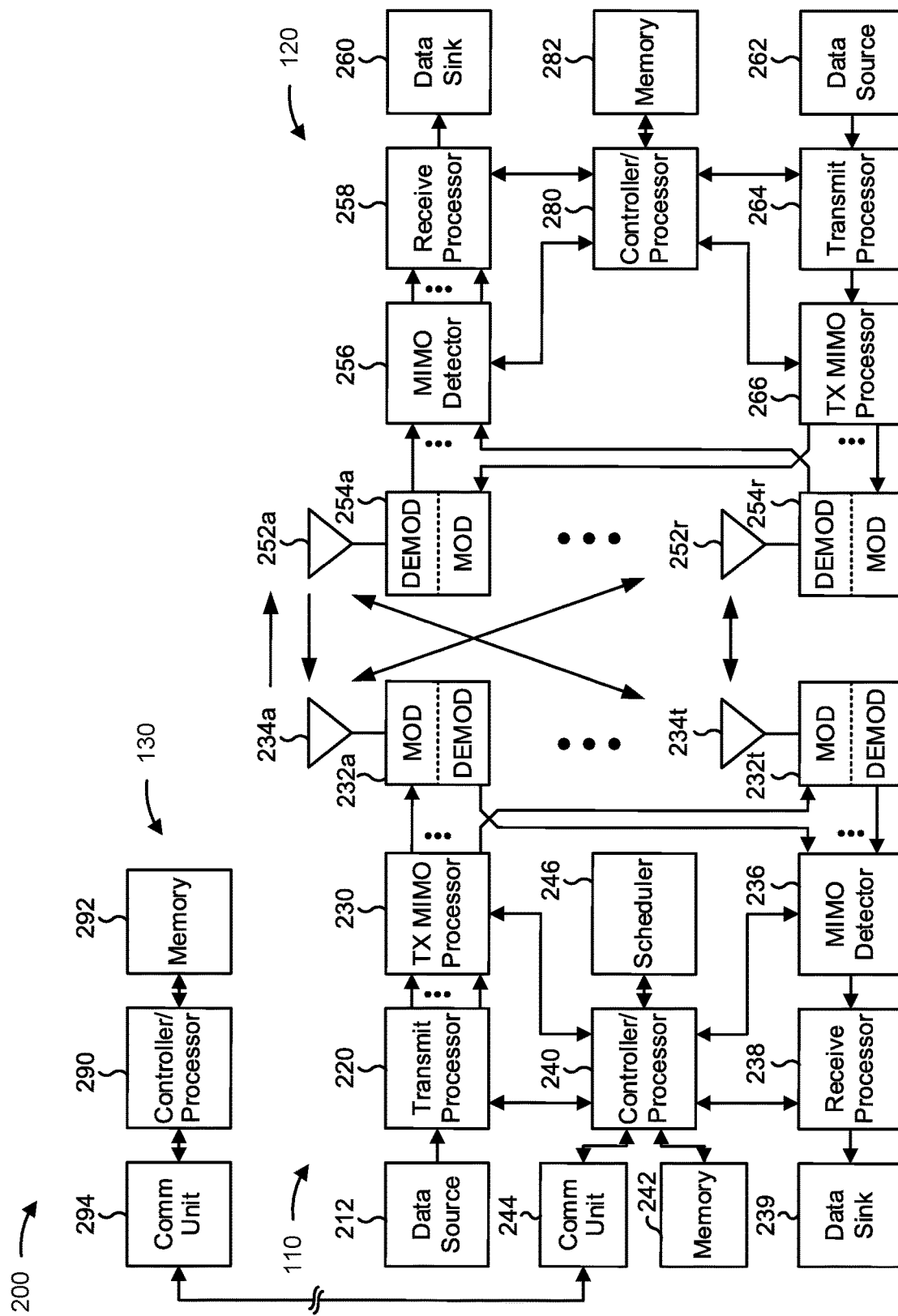
FIG. 2 is a block diagram illustrating an example of a base station in communication with a UE in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234*a* through 234*t*, and UE 120 may be equipped with R antennas 252*a* through 252*r*, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232*a* through 232*t*. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232*a* through 232*t* may be transmitted via T antennas 234*a* through 234*t*, respectively. According to various aspects described in more detail below, the synchronization signals can be generated with location encoding to convey additional information.

At UE 120, antennas 252*a* through 252*r* may receive the downlink signals from base station 110 and/or other base stations and may provide received signals to demodulators (DEMODs) 254*a* through 254*r*, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254*a* through 254*r*, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254*a* through 254*r* (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with sidelink transmit power control command signaling, as described in more detail elsewhere herein. For example, controller/processor 240 of base station 110, controller/processor 280 of UE 120, and/or any other component(s) of FIG. 2 may perform or direct operations of, for example, process 500 of FIG. 5, process 600 of FIG. 6, process 700 of FIG. 7, and/or other processes as described herein. Memories 242 and 282 may store data and program codes for base station 110 and UE 120, respectively. In some aspects, memory 242 and/or memory 282 may comprise a non-transitory computer-readable medium storing one or more instructions for wireless communication. For example, the one or more instructions, when executed by one or more processors of the base station 110 and/or the UE 120, may perform or direct operations of, for example, process 500 of FIG. 5, process 600 of FIG. 6, process 700 of FIG. 7, and/or other processes as described herein. A scheduler 246 may schedule UEs for data transmission on the downlink and/or uplink.

In some aspects, UE 120 may include means for receiving, from a source UE, a sidelink communication, means for generating a transmit power control command based at least in part on a measurement of the sidelink communication, means for transmitting, via a sidelink feedback channel, the transmit power control command to control a transmit power, for another sidelink communication, of the source UE, and/or the like. In some aspects, UE 120 may include means for transmitting a first sidelink communication via a sidelink, means for receiving, based at least in part on transmitting the first sidelink communication, a transmit power control command via a feedback channel, means for transmitting a second sidelink communication via the sidelink using a transmit power determined based at least in part on the transmit power control command, and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

In some aspects, a network entity (e.g., BS 110 or UE 120) may include means for determining a transmit power control command for a source user equipment, means for transmitting, to control a transmit power for a sidelink communication, the transmit power control command to the source UE, and/or the like. In some aspects, such means may include one or more components of BS 110 described in connection with FIG. 2, such as antenna 234, DEMOD 232, MIMO detector 236, receive processor 238, controller/processor 240, transmit processor 220, TX MIMO processor 230, MOD 232, antenna 234, and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

As indicated above, FIG. 2 is provided as an example. Other examples may differ from what is described with regard to FIG. 2.

In some communications systems, such as in LTE device to device (D2D), LTE V2X, NR V2X, and/or the like, a first UE may communicate with a second UE using a sidelink. For example, a source UE (e.g., a UE that is to be power controlled) may transmit a sidelink communication to a target UE on the sidelink. The source UE may determine a transmit power for the transmission based at least in part on a static stored configuration. However, the static stored configuration may result in excess transmit power that may cause interference with another UE and may reduce a UE battery life. Additionally, or alternatively, the static stored configuration may result in a transmit power that results in insufficient transmit power that causes a communication failure, which could result in a loss of connectivity, a lower data rate, a higher power consumption due to data retransmissions, and/or the like.

Using an open-loop power control technique, the source UE may measure a pathloss of a received transmission (e.g., from another UE on a sidelink, from a BS on an access link, and/or the like) and adjust a transmit power based at least in part on the pathloss. However, open-loop power control may be subject to pathloss measurement errors, such as when the source UE or a target UE is changing location or relative orientation. As a result, open-loop power control may result in poor transmit power determination.

Some aspects described herein define signaling to enable closed-loop transmit power control for sidelink communications. For example, a target UE or a non-target UE may provide feedback directly to a source UE via a sidelink channel, a feedback message, a communication on a sidelink, and/or the like. Additionally, or alternatively, a target UE or a non-target UE may relay feedback to the source UE via a network entity (e.g., a BS or another UE) and may provide the feedback to the network entity via an uplink control channel, an uplink shared channel, or an uplink reference signal. Additionally, or alternatively, the network entity may provide feedback to the source UE via a downlink control information message, a medium access control control element, and/or the like. In this way, an accuracy of transmit power control is improved for sidelink communication, relative to open-loop power control techniques. Moreover, based at least in part on improving the accuracy of transmit power control, a likelihood of dropped communications due to insufficient transmit power and a likelihood of interfering communications due to excessive transmit power may be reduced.

Figure 3:
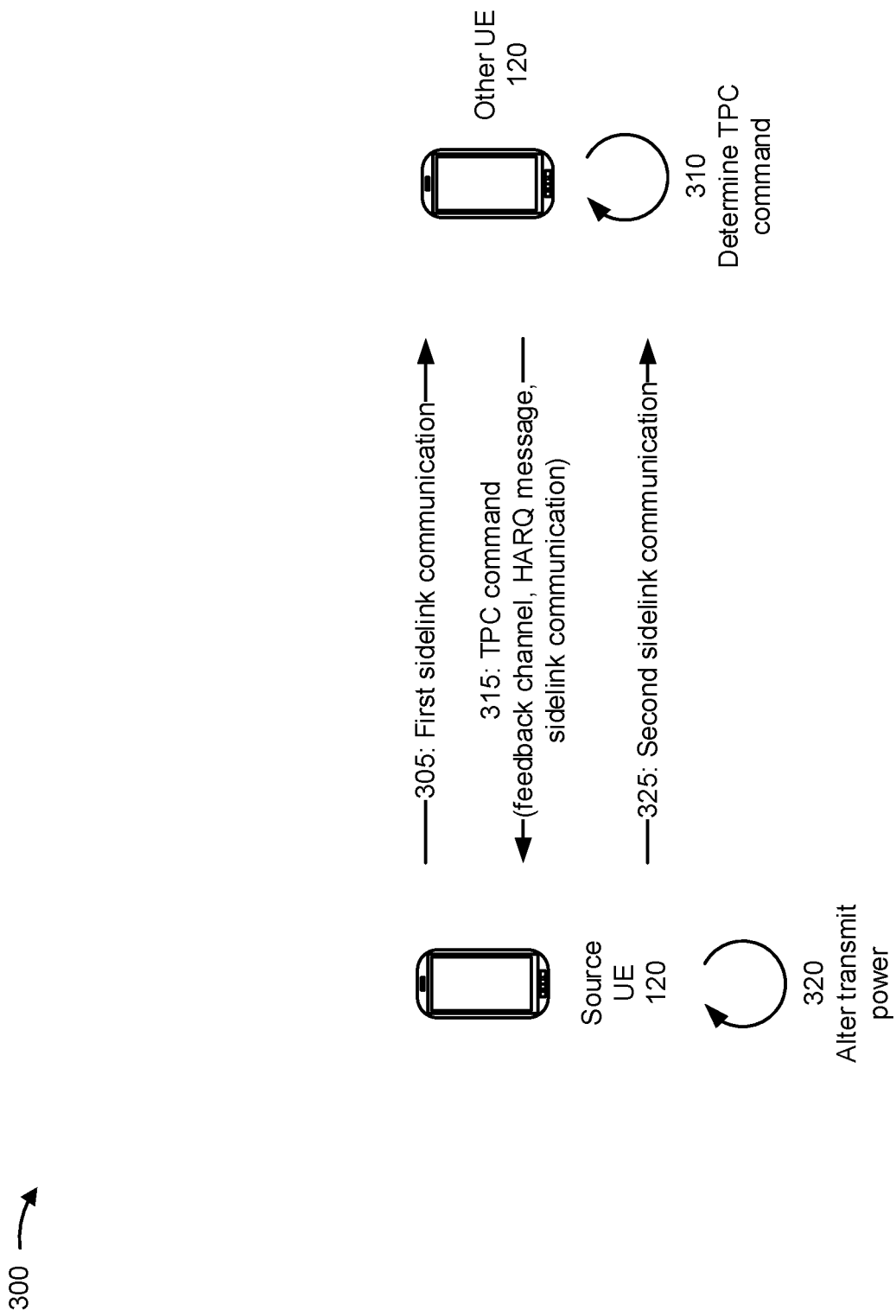
FIGS. 3 and 4 are diagrams illustrating examples of sidelink transmit power control command signaling, in accordance with various aspects of the present disclosure.

FIG. 3 is a diagram illustrating an example 300 of sidelink transmit power control command signaling, in accordance with various aspects of the present disclosure. As shown in FIG. 3, example 300 may include a source UE 120 and another UE 120 (e.g., a target UE 120 or a non-target UE 120), as described in more detail herein.

As further shown in FIG. 3, and by reference number 305, source UE 120 may transmit a first sidelink communication to the other UE 120. For example, source UE 120 may transmit the first sidelink communication to a target UE 120, which is an intended recipient of the first sidelink communication. In this case, the target UE 120 may perform a sidelink reception quality measurement on the first sidelink communication, such as determining a reference signal received power (RSRP), reference signal received quality (RSRQ), reference signal received signal to interference noise ratio (SINR), a hybrid automatic repeat request (HARD) block error rate (BLER), an upper-layer BLER, a BLER of a control channel transmission (such as a physical downlink control channel (PDCCH) or a physical sidelink control channel (PSCCH)), and/or the like.

Additionally, or alternatively, source UE 120 may transmit the first sidelink communication to a non-target UE 120, which is not an intended recipient of the first sidelink communication. For example, based at least in part on source UE 120 being within a threshold proximity of non-target UE 120, the first sidelink communication may interfere with communications of the non-target UE 120. In this case, based at least in part on receiving the interfering first sidelink communication, the non-target UE 120 may perform an interference measurement of the first sidelink communication.

In some aspects, source UE 120 may transmit one or more channels in connection with the first sidelink communication. For example, source UE 120 may transmit a PSCCH, a physical sidelink shared channel (PSSCH), a physical sidelink feedback channel (PSFCH), and/or the like as the first sidelink communication.

As further shown in FIG. 3, and by reference numbers 310 and 315, the other UE 120 may determine a transmit power control (TPC) command and provide the transmit power control command to source UE 120. For example, when the other UE 120 is a target UE 120, the other UE 120 may determine the transmit power control command based at least in part on a sidelink reception quality determination for the first sidelink communication. In this case, the other UE 120 may determine the transmit power control command to ensure an adequate level of transmit power to avoid a dropped communication during a subsequent transmission. Additionally, or alternatively, when the other UE 120 is a non-target UE 120, the other UE 120 may determine the transmit power control command based at least in part on an interference measurement of the first sidelink communication. In this case, the other UE 120 may determine the transmit power control command to avoid interference during a subsequent transmission. In some aspects, the transmit power control command may be component carrier specific.

In some aspects, the other UE 120 may provide the transmit power control command via a feedback channel. For example, the other UE 120 may provide the transmit power control command to source UE 120 via a PSFCH message. In some aspects, the other UE 120 may convey the transmit power control command via a communication also conveying a hybrid automatic repeat request (HARQ) acknowledgement message (ACK), a HARQ negative acknowledgement message (NACK), and/or the like. For example, the other UE 120 may generate a HARQ feedback message with a first quantity of bits (e.g., 1 bit or 2 bits) dedicated for HARQ feedback (e.g., to indicate an ACK or a NACK) and a second quantity of bits (e.g., 1 bit) for a transmit power control command. Additionally, or alternatively, the other UE 120 may convey the transmit power control command via a dedicated PSFCH message (e.g., that does not convey HARQ feedback). In this way, the other UE 120 may support different reliability criteria for transmit power control commands and HARQ feedback messages (e.g., by using different quantities of repetitions and/or different power levels for different PSFCHs and associated PSFCH messages).

In some aspects, the other UE 120 may provide the transmit power control command via a data transmission or control information transmission to source UE 120. For example, the other UE 120 may generate a medium access control (MAC) control element (CE) to convey the transmit power control command using a PSSCH. Additionally, or alternatively, the other UE 120 may set one or more bits of a demodulation reference signal (DMRS) (e.g., UE 120 may choose one among multiple possible DMRS sequences) to convey the transmit power control command using a PSSCH or a PSCCH. In some aspects, the receiver may attempt to demodulate and/or decode the transmission using each of the possible DMRS sequences, thus determining the chosen sequence and the corresponding TPC command.

In some aspects, the other UE 120 may use a HARQ feedback message as a transmit power control command. For example, the other UE 120 may transmit a HARQ NACK to indicate a first value of a transmit power control command (e.g., to indicate an increase to a transmit power) and a HARQ ACK to indicate a second value of a transmit power control command (e.g., to indicate a decrease to the transmit power). In this case, the different HARQ feedback messages may be associated with the same step amount (e.g., the same increase or decrease to the transmit power) or different step amounts (e.g., a first amount of increase to the transmit power and a second, different amount of decrease to the transmit power). In some aspects, the other UE 120 may use a discontinuous transmission (DTX) to indicate another value of a transmit power control command (e.g., to maintain transmit power at a current transmit power level) to support a static payload, as described in more detail herein. In some aspects, the use of HARQ feedback messages to directly control sidelink transmit power may avoid issues of slow convergence (especially in case of dynamic or bursty sidelink activity) of outer-loop power control (e.g., a block-error-rate based control to determine the signal to noise ratio (SNR) target) and concurrent inner-loop power control (e.g., a transmit power control command generated to achieve the SNR target).

In some aspects, the other UE 120 may transmit one or more transmit power control commands for a plurality of source UEs 120. For example, the other UE 120 may receive sidelink communications from a plurality of source UEs 120, and may provide a plurality of transmit power control commands via separate unicast feedback channels to each source UE 120. Additionally, or alternatively, the other UE 120 may transmit one or more transmit power control commands via a single groupcast channel to the plurality of UEs 120. In this case, the other UE 120 may use a group-common downlink control information (DCI) format or may use a MAC CE of a groupcast PSSCH for transmitting the one or more transmit power control commands via the single groupcast channel. In some aspects, each of the intended recipients of the groupcast transmission may be configured to know which of the transmit power control command bits in the DCI or the MAC CE is addressed to control its own transmissions of specific channels.

As further shown in FIG. 3, and by reference numbers 320 and 325, source UE 120 may alter a transmit power and transmit a second sidelink communication. For example, based at least in part on receiving the transmit power control command from the other UE 120, source UE 120 may increase or decrease a transmit power for subsequent sidelink communications. Additionally, or alternatively, source UE 120 may maintain the transmit power at a current transmit power level based at least in part on receiving the transmit power control command. In some aspects, source UE 120 may alter transmit powers of different channels of the second sidelink communication based at least in part on a plurality of received transmit power control commands. In this way, source UE 120 and the other UE 120 enable closed-loop power control for sidelink communications.

As indicated above, FIG. 3 is provided as an example. Other examples may differ from what is described with respect to FIG. 3

Figure 4:
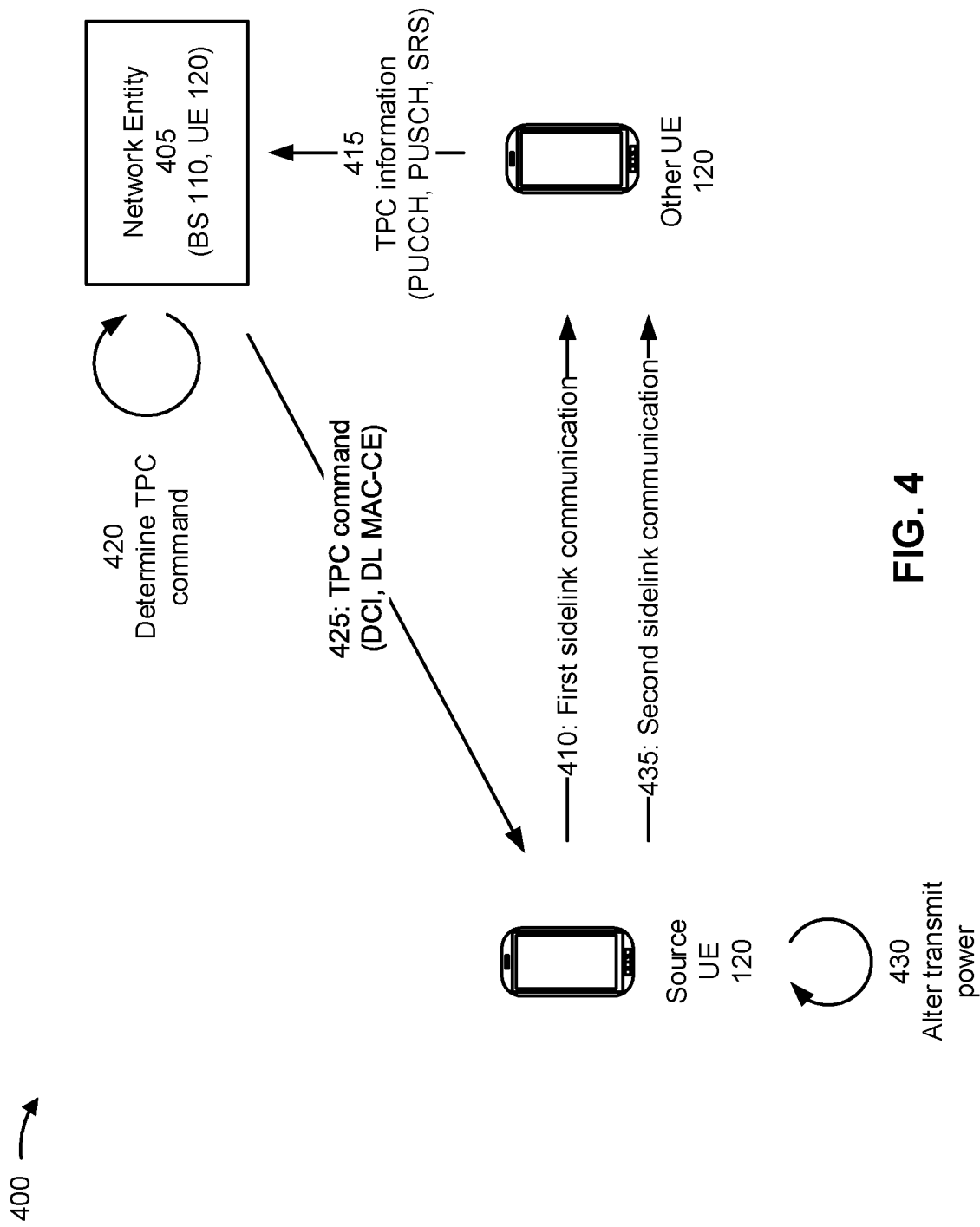

FIG. 4 is a diagram illustrating an example 400 of sidelink transmit power control command signaling, in accordance with various aspects of the present disclosure. As shown in FIG. 4, example 400 may include a network entity 405 (e.g., which may be a BS, such as a relay BS, or a UE, such as a relay UE), a source UE 120, and another UE 120 (e.g., which may be a target UE or a non-target UE), as described in more detail herein.

As further shown in FIG. 4, and by reference number 410, source UE 120 may transmit a first sidelink communication to the other UE 120. For example, source UE 120 may transmit the first sidelink communication to a target UE 120, which is an intended recipient of the first sidelink communication. In this case, the target UE 120 may perform a sidelink reception quality measurement on the first sidelink communication, such as by determining an RSRQ.

Additionally, or alternatively, source UE 120 may transmit the first sidelink communication to a non-target UE 120, which is not an intended recipient of the first sidelink communication. For example, based at least in part on source UE 120 being within a threshold proximity of non-target UE 120, the first sidelink communication may interfere with communications of non-target UE 120. In this case, based at least in part on receiving the first sidelink communication, non-target UE 120 may perform an interference measurement of the first sidelink communication. Additionally, or alternatively, based at least in part on network entity 405 being within the threshold proximity of source UE 120, network entity 405 may perform a measurement of the first sidelink communication, such as an interference measurement of the first sidelink communication.

As further shown in FIG. 4, and by reference number 415, the other UE 120 may provide transmit power control information to network entity 405 for relay to source UE 120. For example, the other UE 120 may provide information identifying a transmit power control command determined by the other UE 120, as described in more detail herein. Additionally, or alternatively, the other UE 120 may provide, to network entity 405, information identifying a measurement performed by the other UE 120, such as a reception quality measurement, an interference measurement, and/or the like, to enable network entity 405 to determine a transmit power control command.

In some aspects, the other UE 120 may provide the transmit power control command in connection with a transmission of another feedback message. For example, the other UE 120 may provide the transmit power control command with and/or using an ACK, a NACK, a scheduling request (SR), a channel state information (CSI) message, and/or the like. Additionally, or alternatively, the other UE 120 may provide the transmit power control command in connection with a transmission of a sidelink feedback message. For example, the other UE 120 may provide the transmit power control command with and/or using a sidelink CSI message that is being provided to network entity 405 for relay to source UE 120.

In some aspects, the other UE 120 may provide the transmit power control command to network entity 405 via an uplink control information (UCI) message of a physical uplink control channel (PUCCH). For example, the other UE 120 may use a dedicated field of a UCI for a sidelink transmit power control command or may include the transmit power control command in a field used for another message (e.g., an ACK field, a CSI field, and/other like). In some aspects, the other UE 120 may provide the transmit power control command based at least in part on scheduling of a sidelink. For example, the other UE 120 may provide the transmit power control command when the sidelink is scheduled for a second sidelink communication.

In some aspects, the other UE 120 may provide the transmit power control command using a fixed payload. For example, a message that is to convey the transmit power control command may include a fixed payload dedicated for the transmit power control command, and the other UE 120 may include a transmit power control command even when the transmit power of source UE 120 is not to be changed, for example, because no additional transmission was received from the source based at least in part on which a further adjustment or change to its transmit power may be computed. Additionally, or alternatively, the other UE 120 may provide the transmit power control command using a dynamic payload. In this case, the other UE 120 may forgo providing the transmit power control command when there is no change to the transmit power, and network entity 405 and/or source UE 120 may interpret a lack of a transmit power control command as indicating that there is to be no change to the transmit power for a second sidelink communication. In some aspects, network entity 405 may configure whether to use a fixed payload or a dynamic payload, such as based at least in part on a quantity of sidelinks, a feedback configuration, an access link configuration, and/or the like.

In some aspects, the other UE 120 may provide the transmit power control command to network entity 405 using a UCI transmission over a physical uplink shared channel (PUSCH) channel. For example, the other UE 120 may add the UCI to a PUSCH transmission to convey the transmit power control command. Additionally, or alternatively, the other UE 120 may provide the transmit power control command via an uplink MAC-CE of a PUSCH. Additionally, or alternatively, the other UE 120 may transmit the transmit power control command to network entity 405 via a reference signal (e.g., a sounding reference signal (SRS)). For example, the other UE 120 may provide the transmit power control command using a single transmit power control command bit in the SRS (e.g., by using one of two different possible SRS sequences, with the choice of sequence indicating the value of a transmit power control command bit).

In some aspects, the other UE 120 may configure the transmit power control command provided to network entity 405 based at least in part on a delay characteristic. For example, the other UE 120 may provide, to network entity 405 for relay, the transmit power control command for transmit power corrections of less than a threshold (e.g., relatively fine adjustments that may be low priority) and may provide, to source UE 120 directly, transmit power control commands for transmit power corrections of greater than or equal to the threshold (e.g., relatively coarse adjustments that may be higher priority). In this case, the other UE 120 may configure different step sizes for transmit power control commands relayed via network entity 405 and transmit power control commands transmitted directly to UE 120. Additionally, or alternatively, the other UE 120 may configure different step-sizes or whether to use relaying based at least in part on a quantity of relay hops (e.g., how many network entities relay the transmit power control command before the transmit power control command is received at source UE 120). In this way, the other UE 120 may account for a delay associated with relaying signaling via network entity 405.

In some aspects, the other UE 120 may provide the transmit power control command to a target UE that is network entity 405 based at least in part on the other UE 120 being a non-target UE. For example, when the other UE 120 performs an interference measurement on an interfering first sidelink communication, the other UE 120 may identify the target UE for the first sidelink communication, and may provide the transmit power control command to the target UE for relay to source UE 120. In this case, the non-target other UE 120 may use on-off signaling to provide the transmit power control command to the target UE. Further, the target UE may combine the transmit power control command from the non-target UE with a generated transmit power control command (e.g., based at least in part on a signal quality measurement) and provide the combined transmit power control command via, for example, a feedback channel, as described above.

As further shown in FIG. 4, and by reference numbers 420 and 425, network entity 405 may determine a transmit power control command and may provide the transmit power control command to source UE 120. For example, based at least in part on receiving a transmit power control command, network entity 405 may determine to relay the transmit power control command to source UE 120. Additionally, or alternatively, based at least in part on receiving information identifying a measurement, network entity 405 may generate a transmit power control command. In this case, network entity 405 may generate the transmit power control command to ensure a level of transmit power in order to avoid a dropped communication during a subsequent transmission and/or to avoid interference during a subsequent transmission. Additionally, or alternatively, network entity 405 may generate the transmit power control command based at least in part on a measurement performed by network entity 405. For example, network entity 405 may determine an alteration to a transmit power of source UE 120 based at least in part on performing a measurement of the first sidelink communication.

In some aspects, network entity 405 may provide the transmit power control command via a DCI message. For example, network entity 405 may provide a DCI identifying the transmit power control command and including a sidelink grant to source UE 120 to enable source UE 120 to transmit a second sidelink communication (e.g., using resources of the sidelink grant and with a transmit power configured based at least in part on the transmit power control command). Additionally, or alternatively, network entity 405 may provide a dedicated DCI to convey the transmit power control command (e.g., using a sidelink-based radio network temporary identifier (RNTI) to identify the sidelink to which the DCI applies).

In some aspects, network entity 405 may provide a group-common transmit power control command to a plurality of source UEs 120 to control transmit powers of the plurality of source UEs 120. In some aspects, network entity 405 may provide transmit power control commands for a plurality of types of links. For example, network entity 405 may provide a message including a transmit power control command for a sidelink (e.g., to control a transmit power of a second sidelink communication) and a transmit power control command for an access link (e.g., to control an uplink transmission to network entity 405).

In some aspects, network entity 405 may provide the transmit power control command via a downlink MAC-CE. For example, network entity 405 may provide a unicast MAC-CE to a single source UE 120 to control the single source UE 120, a groupcast or broadcast MAC-CE to a plurality of source UEs 120 to control the plurality of source UEs 120, and/or the like.

As further shown in FIG. 4, and by reference numbers 430 and 435, source UE 120 may alter a transmit power and transmit a second sidelink communication. For example, based at least in part on receiving the transmit power control command from network entity 405, source UE 120 may alter a transmit power for subsequent sidelink communications. In some aspects, source UE 120 may receive a plurality of transmit power control commands. For example, source UE 120 may receive a transmit power control command from network entity 405, from a UE 120 (e.g., a target UE, a non-target UE, and/or the like), and may aggregate the transmit power control commands to determine a subsequent transmit power.

In this way, source UE 120, network entity 405, and the other UE 120 enable closed-loop power control for sidelink communications. Moreover, based at least in part on the other UE 120 relaying a transmit power control command via network entity 405, transmit power control may be improved based at least in part on network entity 405 (e.g., a BS) having additional information regarding configurations of UEs in a cell (e.g., whether discontinuous reception (DRX) is employed in the cell), thereby enabling groupcasting of transmit power control commands, which may reduce resource utilization.

As indicated above, FIG. 4 is provided as an example. Other examples may differ from what is described with respect to FIG. 4.

Figure 5:
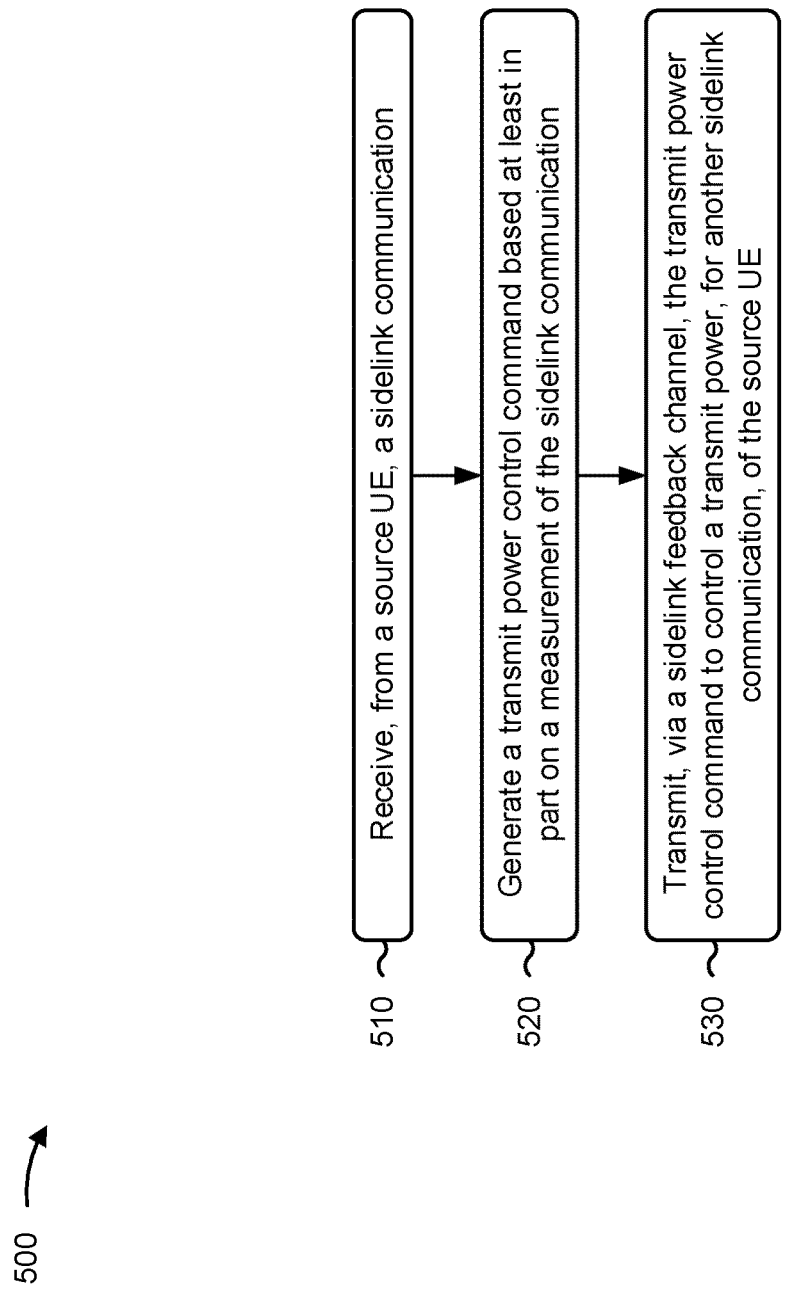
FIG. 5 is a diagram illustrating an example process performed, for example, by a user equipment, in accordance with various aspects of the present disclosure.

FIG. 5 is a diagram illustrating an example process 500 performed, for example, by a UE, in accordance with various aspects of the present disclosure. Example process 500 is an example where a UE (e.g., UE 120 and/or the like) performs operations associated with sidelink transmit power control command signaling.

As shown in FIG. 5, in some aspects, process 500 may include receiving, from a source UE, a sidelink communication (block 510). For example, the UE (e.g., using receive processor 258, transmit processor 264, controller/processor 280, memory 282, and/or the like) may receive, from a source UE, a sidelink communication, as described above.

As further shown in FIG. 5, in some aspects, process 500 may include generating a transmit power control command based at least in part on a measurement of the sidelink communication (block 520). For example, the UE (e.g., using receive processor 258, transmit processor 264, controller/processor 280, memory 282, and/or the like) may generate a transmit power control command based at least in part on a measurement of the sidelink communication, as described above.

As further shown in FIG. 5, in some aspects, process 500 may include transmitting, via a sidelink feedback channel, the transmit power control command to control a transmit power, for another sidelink communication, of the source UE (block 530). For example, the UE (e.g., using receive processor 258, transmit processor 264, controller/processor 280, memory 282, and/or the like) may transmit, via a sidelink feedback channel, the transmit power control command to control a transmit power, for another sidelink communication, of the source UE, as described above.

Process 500 may include additional aspects, such as any single aspect or any combination of aspects described below and/or in connection with one or more other processes described elsewhere herein.

In a first aspect, the sidelink feedback channel is a physical sidelink feedback channel.

In a second aspect, alone or in combination with the first aspect, the transmit power control command and a hybrid automatic repeat request feedback message are both conveyed via the sidelink feedback channel.

In a third aspect, alone or in combination with one or more of the first and second aspects, the sidelink feedback channel is a first sidelink feedback channel, to convey the transmit power control command, and a hybrid automatic repeat request feedback message is conveyed via a second sidelink feedback channel that is different from the first sidelink feedback channel.

In a fourth aspect, alone or in combination with one or more of the first through third aspects, the transmit power control command is conveyed in connection with a transmission of data or other control information to the source UE.

In a fifth aspect, alone or in combination with one or more of the first through fourth aspects, the transmit power control command is conveyed via at least one of a medium access control control element of a physical sidelink shared channel, a payload of the physical sidelink shared channel or a physical sidelink control channel, or a demodulation reference signal of the physical sidelink shared channel or the physical sidelink control channel.

In a sixth aspect, alone or in combination with one or more of the first through fifth aspects, the transmit power control command is a hybrid automatic repeat request message that causes an alteration to the transmit power of the source UE.

In a seventh aspect, alone or in combination with one or more of the first through sixth aspects, the transmit power control command is conveyed via a unicast feedback channel to the source UE, and one or more other transmit power control commands are transmitted via a corresponding one or more other unicast feedback channels to one or more other source UEs.

In an eighth aspect, alone or in combination with one or more of the first through seventh aspects, the transmit power control command is conveyed via a groupcast transmission or a group-common transmission to a plurality of UEs to which the transmit power control command is to apply.

In a ninth aspect, alone or in combination with one or more of the first through eighth aspects, transmitting the transmit power control command includes transmitting the transmit power control command to a network entity for relay to the source UE.

In a tenth aspect, alone or in combination with one or more of the first through ninth aspects, the network entity is a relay base station or a relay UE.

In an eleventh aspect, alone or in combination with one or more of the first through tenth aspects, the transmit power control command is conveyed to the network entity via at least one of a physical uplink control channel, a physical uplink shared channel, or a sounding reference signal.

In a twelfth aspect, alone or in combination with one or more of the first through eleventh aspects, the transmit power control command is conveyed to the network entity with at least one of an acknowledgement or negative acknowledgement feedback message, a scheduling request, an access link channel state information message, or a channel state information message.

In a thirteenth aspect, alone or in combination with one or more of the first through twelfth aspects, the transmit power control command is conveyed to the network entity via an uplink control information of a physical uplink control channel message.

In a fourteenth aspect, alone or in combination with one or more of the first through thirteenth aspects, the transmit power control command is indicated using a dedicated field of the uplink control information or using a shared field of the uplink control information.

In a fifteenth aspect, alone or in combination with one or more of the first through fourteenth aspects, the transmit power control command is generated based at least in part on the other sidelink communication being scheduled.

In a sixteenth aspect, alone or in combination with one or more of the first through fifteenth aspects, the transmit power control command is reported based at least in part on a fixed reporting configuration or a variable reporting configuration.

In a seventeenth aspect, alone or in combination with one or more of the first through sixteenth aspects, the transmit power control command is conveyed to the network entity via an uplink control information of a physical uplink shared channel message or a medium access control control element of the physical uplink shared channel message.

In an eighteenth aspect, alone or in combination with one or more of the first through seventeenth aspects, the transmit power control command is an instruction to maintain a current transmit power level.

Although FIG. 5 shows example blocks of process 500, in some aspects, process 500 may include additional blocks, fewer blocks, different blocks, or differently arranged blocks than those depicted in FIG. 5. Additionally, or alternatively, two or more of the blocks of process 500 may be performed in parallel.

Figure 6:
FIG. 6 is a diagram illustrating an example process performed, for example, by a network entity, in accordance with various aspects of the present disclosure.

FIG. 6 is a diagram illustrating an example process 600 performed, for example, by a UE, in accordance with various aspects of the present disclosure. Example process 600 is an example where a network entity (e.g., BS 110, UE 120, network entity 405, and/or the like) performs operations associated with sidelink transmit power control command signaling.

As shown in FIG. 6, in some aspects, process 600 may include determining a transmit power control command for a UE (block 610). For example, the network entity (e.g., using controller/processor 240, controller/processor 280, and/or the like) may determine a transmit power control command for a source UE, as described above.

As further shown in FIG. 6, in some aspects, process 600 may include transmitting, to control a transmit power for a sidelink communication, the transmit power control command to the source UE (block 620). For example, the network entity (e.g., using controller/processor 240, transmit processor 220, TX MIMO processor 230, MOD 232, antenna 234, controller/processor 280, transmit processor 264, TX MIMO processor 266, MOD 254, antenna 252, and/or the like) may transmit, to control a transmit power for a sidelink communication, the transmit power control command to the source UE, as described above.

Process 600 may include additional aspects, such as any single aspect or any combination of aspects described below and/or in connection with one or more other processes described elsewhere herein.

In a first aspect, the network entity is a base station or another UE.

In a second aspect, alone or in combination with the first aspect, the transmit power control command is based at least in part on a received feedback message from a target UE or a non-target UE and is conveyed via a downlink control information message to control sidelink operation.

In a third aspect, alone or in combination with one or more of the first and second aspects, the transmit power control command is based at least in part on a received feedback message from a target UE or a non-target UE and is conveyed via the same message as one or more sidelink grants.

In a fourth aspect, alone or in combination with one or more of the first through third aspects, the transmit power control command is conveyed via a group-common message to control sidelink operation of a plurality of UEs.

In a fifth aspect, alone or in combination with one or more of the first through fourth aspects, the transmit power control command and another transmit power control command for an access link transmission of the source UE are conveyed via a common message.

In a sixth aspect, alone or in combination with one or more of the first through fifth aspects, the transmit power control command is component carrier specific, or applies to a group of component carriers (CCs), where the group may be configured explicitly based on sharing common power control commands, or may be configured based on other attributes (e.g., a group of CCs sharing the same timing-advance command, which may be a timing advance group (TAG)), or sharing the same beams, and/or the like.

In a seventh aspect, alone or in combination with one or more of the first through sixth aspects, the transmit power control command is conveyed via a medium access control control element.

In an eighth aspect, alone or in combination with one or more of the first through seventh aspects, the medium access control control element is one of a unicast message, a groupcast message, or a broadcast message.

In a ninth aspect, alone or in combination with one or more of the first through eighth aspects, process 600 may include receiving a message from another UE identifying the transmit power control command; and transmitting the transmit power control command comprises relaying the transmit power control command.

In a tenth aspect, alone or in combination with one or more of the first through ninth aspects, the message from the other UE is received via at least one of a physical uplink control channel, a physical uplink shared channel, or a sounding reference signal.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

FIG. 7 is a diagram illustrating an example process 700 performed, for example, by a UE, in accordance with various aspects of the present disclosure. Example process 700 is an example where a source UE (e.g., UE 120 and/or the like) performs operations associated with sidelink transmit power control command signaling.

As shown in FIG. 7, in some aspects, process 700 may include transmitting a first sidelink communication via a sidelink (block 710). For example, the source UE (e.g., using receive processor 258, transmit processor 264, controller/ processor 280, memory 282, and/or the like) may transmit a first sidelink communication via a sidelink, as described above.

As further shown in FIG. 7, in some aspects, process 700 may include receiving, based at least in part on transmitting the first sidelink communication, a transmit power control command via a feedback channel (block 720). For example, the source UE (e.g., using receive processor 258, transmit processor 264, controller/processor 280, memory 282, and/or the like) may receive, based at least in part on transmitting the first sidelink communication, a transmit power control command via a feedback channel, as described above.

As further shown in FIG. 7, in some aspects, process 700 may include transmitting a second sidelink communication via the sidelink using a transmit power determined based at least in part on the transmit power control command (block 730). For example, the source UE (e.g., using receive processor 258, transmit processor 264, controller/processor 280, memory 282, and/or the like) may transmit a second sidelink communication via the sidelink using a transmit power determined based at least in part on the transmit power control command, as described above.

Process 700 may include additional aspects, such as any single aspect or any combination of aspects described below and/or in connection with one or more other processes described elsewhere herein.

In a first aspect, the transmit power control command is received from another UE via the sidelink and via at least one of a physical sidelink feedback channel, a physical sidelink control channel, a control information transmission, or a data transmission.

In a second aspect, alone or in combination with the first aspect, the transmit power control command is received from a base station via at least one of a downlink control information message or a medium access control control element.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a first user equipment (UE), comprising:
   receiving, from at least one source UE of a plurality of source UEs, a sidelink communication;
   generating one or more transmit power control commands for the plurality of source UEs based at least in part on a measurement of the sidelink communication; and
   transmitting, via a single groupcast channel and to the plurality of source UEs, a groupcast transmission comprising one or more bits that are each associated with:
      at least one particular source UE of the plurality of source UEs, and
      at least one transmit power control command of the one or more transmit power control commands to control a transmit power, for another sidelink communication, of a respective source UE of the plurality of source UEs.

2. The method of claim 1, wherein the single groupcast channel is a physical sidelink shared channel.

3. The method of claim 1, wherein the groupcast transmission and a hybrid automatic repeat request feedback message are both transmitted via the single groupcast channel.

4. The method of claim 1, wherein the single groupcast channel is a first sidelink channel to transmit the one or more transmit power control commands, and wherein a hybrid automatic repeat request feedback message is transmitted via a second sidelink channel that is different from the first sidelink channel.

5. The method of claim 1, wherein the groupcast transmission is transmitted in connection with a transmission of data or other control information to the plurality of source UEs.

6. The method of claim 5, wherein the groupcast transmission is transmitted via at least one of:
a medium access control control element of the single groupcast channel,
a payload of the single groupcast channel, or
a demodulation reference signal of the single groupcast channel.

7. The method of claim 1, wherein the groupcast transmission causes an alteration to the transmit power of the respective source UE.

8. The method of claim 1, further comprising:
transmitting the groupcast transmission to a network entity for relay to the plurality of source UEs.

9. The method of claim 8, wherein the network entity is a relay network node or a relay UE.

10. The method of claim 8, wherein the groupcast transmission is transmitted to the network entity via at least one of: a physical uplink control channel, a physical uplink shared channel, or a sounding reference signal.

11. The method of claim 8, wherein groupcast transmission is transmitted to the network entity with at least one of:
an acknowledgement or negative acknowledgement feedback message,
a scheduling request, or
a channel state information message, and
wherein the one or more transmit power control commands are related to at least one of an access link, a sidelink, or a combination thereof.

12. The method of claim 8, wherein the groupcast transmission is transmitted to the network entity via an uplink control information of a physical uplink control channel message.

13. The method of claim 12, wherein the at least one transmit power control command is generated based at least in part on another sidelink communication being scheduled.

14. The method of claim 12, wherein the one or more transmit power control is commands are reported based at least in part on a fixed reporting configuration or a variable reporting configuration.

15. The method of claim 8, wherein the groupcast transmission is transmitted to the network entity via an uplink control information of a physical uplink shared channel message or a medium access control control element of the physical uplink shared channel message.

16. The method of claim 1, wherein the one or more transmit power control commands are each an instruction to maintain a current transmit power level.

17. A method of wireless communication performed by a network entity, comprising:
receiving, from a source user equipment (UE), a transmit power control command for the source UE, wherein the transmit power control command is based at least in part on a delay characteristic associated with relaying signaling from the source UE to another UE via the network entity; and
transmitting, to control a transmit power for a sidelink communication, the transmit power control command to the source UE.

18. The method of claim 17, wherein the network entity is a base station or another UE.

19. The method of claim 17, wherein the transmit power control command is based at least in part on a received feedback message from a target UE or a non-target UE and is conveyed via a downlink control information message to control sidelink operation.

20. The method of claim 17, wherein the transmit power control command is based at least in part on a received feedback message from a target UE or a non-target UE and is conveyed via the same message as one or more sidelink grants.

21. The method of claim 17, wherein the transmit power control command is conveyed via a group-common message to control sidelink operation of a plurality of UEs.

22. The method of claim 17, wherein the transmit power control command and another transmit power control command for an access link transmission of the source UE are conveyed via a common message.

23. The method of claim 17, wherein the transmit power control command is component carrier specific.

24. A method of wireless communication performed by a source user equipment (UE), comprising:
transmitting a first sidelink communication via a sidelink;
receiving, based at least in part on transmitting the first sidelink communication via a feedback channel, a hybrid automatic repeat request (HARQ) message with a first quantity of bits dedicated for HARQ feedback and a second quantity of bits dedicated for a transmit power control command; and
transmitting a second sidelink communication via the sidelink using a transmit power determined based at least in part on the transmit power control command.

25. The method of claim 24, wherein the transmit power control command is received from another UE via the sidelink and via at least one of a physical sidelink feedback channel, a physical sidelink control channel, a control information transmission, or a data transmission.

26. The method of claim 24, wherein the transmit power control command is received from a network entity via at least one of a downlink control information message or a medium access control control element.

27. A user equipment (UE) for wireless communication, comprising:
a memory; and
one or more processors coupled to the memory, the one or more processors configured to:
receive, from at least one source UE of a plurality of source UEs, a sidelink communication;
generate one or more transmit power control commands for the plurality of source UEs based at least in part on a measurement of the sidelink communication; and
transmit, via a single groupcast channel and to the plurality of source UEs, a groupcast transmission comprising one or more bits that are each associated with:
at least one particular source UE of the plurality of source UEs, and
at least one transmit power command of the one or more transmit power control commands to control a transmit power, for another sidelink communication, of a respective source UE of the plurality of source UEs.

28. The UE of claim 27, wherein the single groupcast channel is a physical sidelink shared channel.

29. The UE of claim 27, wherein the groupcast transmission and a hybrid automatic repeat request feedback message are both conveyed via the single groupcast channel.

30. The UE of claim 27, wherein the groupcast transmission and a hybrid automatic repeat request feedback message are both transmitted via the single groupcast channel.

* * * * *